United States Patent
Yu

(10) Patent No.: US 8,169,103 B2
(45) Date of Patent: May 1, 2012

(54) DATA-READY POWER MAINS DISTRIBUTION PANEL AND DATA COUPLER

(75) Inventor: Hong Yu, Hollis, NH (US)

(73) Assignee: Aboundi, Inc., Nashua, NH (US)

( * ) Notice: Subject to any disclaimer, the term of this patent is extended or adjusted under 35 U.S.C. 154(b) by 221 days.

(21) Appl. No.: 12/587,363

(22) Filed: Oct. 7, 2009

(65) Prior Publication Data

US 2011/0080692 A1    Apr. 7, 2011

(51) Int. Cl.
*H02J 3/00* (2006.01)
(52) U.S. Cl. .......................................................... 307/3
(58) Field of Classification Search ................... 307/3
See application file for complete search history.

(56) References Cited

U.S. PATENT DOCUMENTS

| | | | |
|---|---|---|---|
| 5,187,865 A * | 2/1993 | Dolin, Jr. .................... | 29/868 |
| 7,307,510 B2 * | 12/2007 | Berkman ................... | 340/12.32 |
| 7,356,086 B1 * | 4/2008 | Landry et al. .............. | 375/257 |
| 2009/0121547 A1 * | 5/2009 | Paik et al. .................. | 307/34 |
| 2009/0134996 A1 * | 5/2009 | White et al. ................ | 340/538 |

* cited by examiner

*Primary Examiner* — Robert L. Deberadinis
(74) *Attorney, Agent, or Firm* — Joanne M. Martin

(57) ABSTRACT

A power mains distribution panel including a data signal coupler providing a data path across multiple circuits therein. The power mains distribution or breaker panel provides mains power distribution from multiple non-neutral (i.e. having a voltage and providing a flow of current relative to each other or a common or neutral wire or virtual point, also called 'hot') mains circuits of a single or multiple phase for distribution within the distribution or breaker panel to branch circuits which in turn have a data path therebetween according to the present invention. Also described is a particular data signal coupler which may be used in the embodiments of the power mains distribution panels according to the present invention.

14 Claims, 2 Drawing Sheets

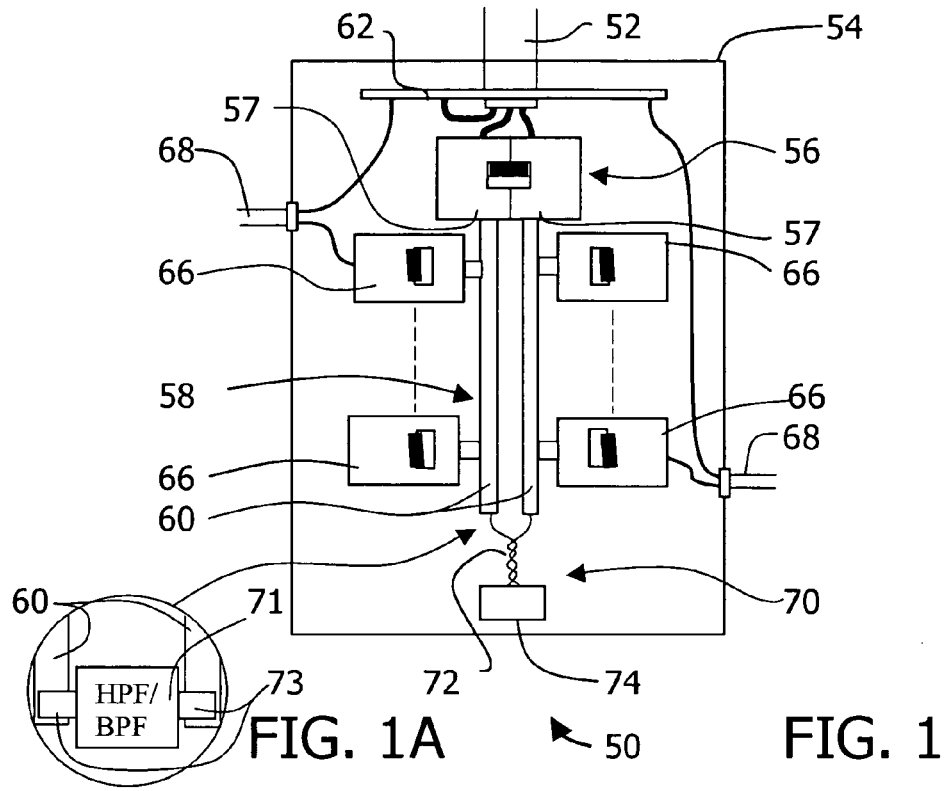
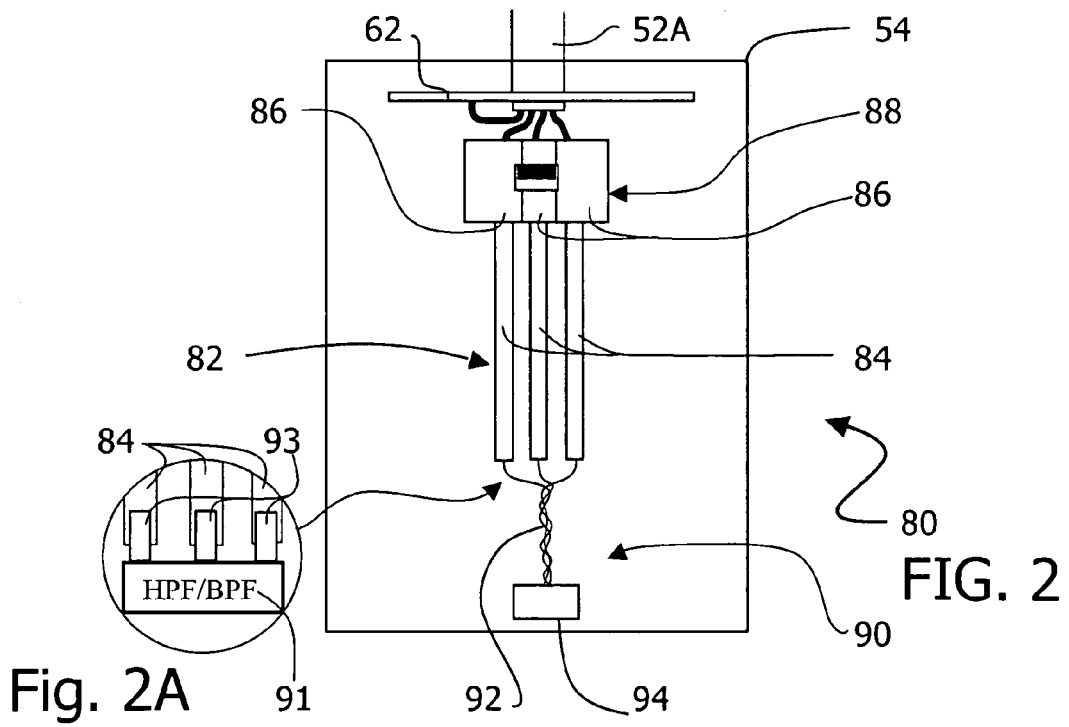

DATA-READY POWER MAINS DISTRIBUTION PANEL AND DATA COUPLER

FIELD OF THE INVENTION

The present invention relates to data-over-power line (power mains) infrastructure, in particular, distribution or breaker panel systems having structures to provide data path continuity.

BACKGROUND OF THE INVENTION

Data transmission over power mains (or any non-data wire medium) relies on the basic continuity of that medium on which to establish and maintain the data flow thereover. Typically data transmissions is needed across multiple circuits having origins in different mains supply circuits which may be of the same or different phase and are each represented by a different (and typically isolated at data signal frequencies) power main feed line into a distribution panel. It is desirable to provide a data signal coupling within the distribution panel at least across the mains-powered, non-neutral circuits to provide a usable data path between (and for multi-phase panels, among) such circuits to provide data path with integrity to all connected equipment.

Moreover, while network installers are frequently only installing data signal level equipment and wiring, such installers are typically very reluctant to add any connections to the internal space of a mains distribution panel, and there is often a similar reluctance for primary power mains workers to be responsible for yet another class of wiring, circuitry and signal integrity. Therefore, it is desirable to provide a pre-wired data-ready mains distribution panel having the appropriate data and power mains path structures therein without additional circuitry installations.

SUMMARY OF THE INVENTION

The present invention provides data path across multiple circuits in a power mains distribution or breaker panel with or without a mains circuit breaker or relay, power meter or power mains filter or surge protector therein having multiple non-neutral (i.e. having a voltage and providing a flow of current relative to each other or a common or neutral wire or virtual point, also called 'hot') mains circuits of a single or multiple phase for distribution within the distribution or breaker panel to branch circuits which in turn have a data path therebetween. The multiple power mains circuits are distributed in the breaker or distribution panel from a common point or parallel connecting bars (also called a 'busbars', each point or bar being powered by a different power mains circuit. Further according to the present invention, a data signal coupler is connected across two or more of the common points or parallel busbars to provide a data path thereacross or therebetween, and is mounted within or on the breaker or distribution panel housing requiring no attention by the power mains or network data installer to provide both a power mains distribution and a data signal distribution across the power mains circuits distributed therein.

BRIEF DESCRIPTION OF THE DRAWING

These and further features according to the present invention are better understood by reading the following Detailed Description, taken together with the Drawing, wherein:

FIG. 1 is an elevation view of a typical circuit 2-circuit breaker panel according to one embodiment of the present invention;

FIG. 1A is an elevation view of an alternate embodiment of a coupler associated with the embodiment of FIG. 1;

FIG. 2 is a simplified block diagram of a typical 3-phase circuit breaker panel embodiment of the present invention;

FIG. 2A is an elevation view of an alternate embodiment of a coupler associated with the embodiment of FIG. 2;

DETAILED DESCRIPTION

Figure 3A:
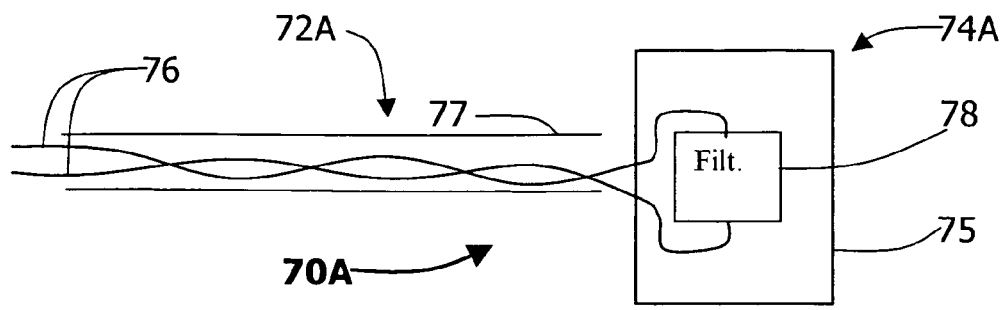
FIG. 3A is a block diagram of a 2-circuit data signal coupler according to one embodiment of the present invention.

A typical power distribution or circuit breaker panel physical layout 50 is shown in FIG. 1, wherein a 2-phase (2 single phase lines 180 degrees apart), or 2 phases of a 3-phase power mains 120 degrees apart, line side power mains connection 52, also called 'street side' connection, is shown entering the housing or box 54, and the non-neutral power mains wires are connected to a panel main breaker 56 having a main breaker 56. The single phase power mains (52) connections with one voltage (e.g. 240V) or 2 of 3 phase (208V) across the 2 non-neutral supply leads and 120V from supply lead to neutral typically would have the corresponding number (2) of main breakers sections 57, which are generally provide significant isolation between sections at the power mains or network data frequencies. The neutral power mains lead is typically connected to a neutral busbar 62 in turn directly connected to branch circuits 68 and often electrically associated with ground or an earth connection. The representative main breaker 56 may typically comprise a circuit breaker, or for the purposes of the present invention also include a relay, fuse, a controller, a contactor, a meter, a filter, etc. for one or each phase or circuit of the power mains connection provided as is generally known in the art. The 'load side' of the circuit breaker 56 is typically connected directly to a distribution busbar 58 typically comprising two or more generally similar conductive bars 60, typically straight and parallel in orientation within a dimension of the housing 54 to which multiple breakers or other circuit interrupters 66 are connected for distribution to branch circuits 68.

Also in FIG. 1, a data signal coupler 70 comprising a coupling filter 74 and connecting leads 72 is mounted within (or on a surface of) the housing 54 and connected to the busbar 60 by a connecting leads 72 having a number corresponding to the busbar 60 circuits to be coupled at data signal frequencies. An alternate embodiment of the coupling filter 70 is shown in FIG. 1A, which is directly connected and mounted on the busbars 60 with clip-on or screw secured busbar engaging connectors 73. The filters 71 and 74 typically comprise high pass and/or band-pass filters as discussed elsewhere herein.

A simplified alternate embodiment 80 according to the present invention is shown in FIG. 2, wherein the 'street side' power mains delivers a 3-phase power with a neutral wire (if provided, called 3-phase 4-wire) connected to the neutral busbar 62 and 3 'hot' or non-neutral wires each having a different relative phase with a voltage (e.g. 208V) between any 2 of the 3 phases and lesser voltage (e.g. 120V) between any one phase and the neutral busbars 60, wherein these 3 non-neutral power mains wires are connected to a breaker 88 having a corresponding number of electrically and data signal isolated breaker sections 86. The mains distribution busbars 82 comprises three busbars 84 each connected to a corresponding one of the breaker sections 86, and ultimately to branch circuits (e.g. 68 of FIG. 1) via linking breakers (e.g. 66 of FIG. 1).

Similar to the embodiment 50 of FIG. 1, data is coupled between and among the busbars 84 by a data signal coupler 90 comprising a coupling filter 94 and connecting leads 92 is mounted within (or on a surface of) the housing 54 and connected to the busbars 82 by a connecting leads 92 having a number corresponding to the busbar circuits (e.g. 3 in FIG. 2) to be coupled at data signal frequencies. An alternate embodiment of the coupling filter 94 is shown in FIG. 1A, which is directly connected and mounted on the busbars 84 with clip-on or screw secured busbar engaging connectors 93. The filters 71 and 74 typically comprise high pass and/or band-pass filters as discussed elsewhere herein.

A two-circuit data signal coupler 70A is shown in FIG. 3A, wherein a filter 78 is included within a housing 75 and connected to two external panel busbar circuits (not shown) with leads 76. The leads 76 typically comprise plastic insulated 16 to 20 gauge wire tightly twisted (from about 2 to 6 twists per inch) of a typical length of 2 to 12 inches between the housing 75 and the termination at the busbars. In one embodiment, the twisted leads 76 are also covered with a plastic covering 77, e.g. a shrink-wrap plastic conformed therearound).

Figure 3B:
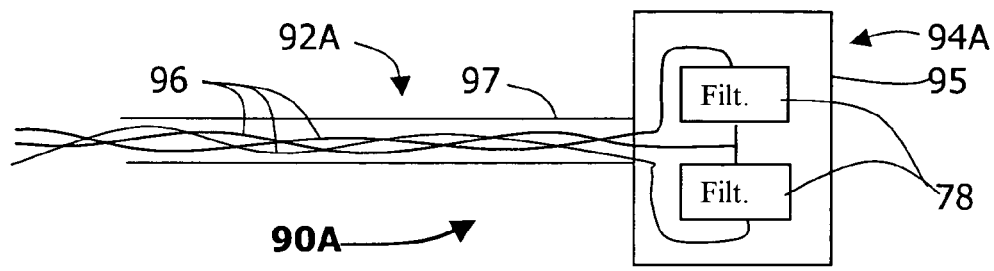
FIG. 3B is a block diagram of a 3-phase data signal coupler according to one embodiment of the present invention.

A three-circuit data signal coupler 90A is shown in FIG. 3B, wherein a filter 78 is included within a housing 95 and connected to the multiple external panel circuits (not shown) with leads 96. The leads 96 typically comprise plastic insulated wire tightly twisted, as described above, extending between the housing 95 and the termination at the busbar. In one embodiment, the twisted leads 96 are also covered with a plastic covering 97, e.g. a shrink-wrap plastic conformed therearound).

Figure 4:
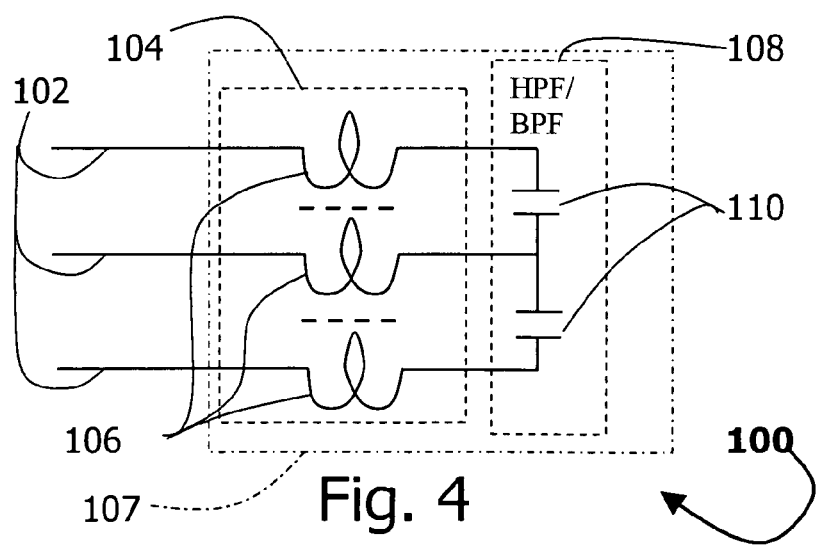
FIG. 4 is a schematic diagram of a multiphase data signal coupler according one embodiment of the present invention.

An exemplary schematic diagram 100 of one embodiment of the data signal coupler is shown in FIG. 4, wherein the leads 102 connected to the panel bus or distribution points are at least partially inductively 106 coupled, and further coupled by a bandpass or high pass filter as exemplified by capacitors 110, chosen to have a desired frequency pass characteristic to provide data signal coupling between and among the connecting leads 102 and a substantially open circuit for the typically 50 or 60 Hz AC power. Typically, the capacitors 110 comprise a range of 0.001 to 10 uF and inductive coupling provided by the twisting of wire leads as described in the embodiments 70A and 90A and covered 104 to be retained in a close relationship, above provide an acceptable coupling of data signals when connected to a typical commercially available distribution panel busbars. Other embodiments having lumped filter elements may be housed together in a single enclosure 107, e.g. filters 71 and 91 of FIGS. 1A and 2A respectively.

While the embodiments shown relate to distribution panels having a main breaker and plural branch breakers connected to a distribution busbars, the scope of the present invention includes any panel or electrical configuration having different circuits including at least one non-neutral wire or path over which a data path is desired and is provided by connecting a particular embodiment of the invention described herein to the non-neutral wires. Moreover, the busbars includes a plurality of individual conductors connecting the branch circuit or the corresponding branch circuit breakers and the power mains connection and/or any intervening circuit breaker, meter, filter, or other device.

Further modifications and substitutions made by one of ordinary skill are within the scope of the present invention which is not to be limited except by the claims which follow.

What is claimed is:

1. A data-ready distribution panel, comprising:
    a power busbar adapted to receive an input of power from a mains connection having at least two non-neutral circuits;
    a data coupler connected to each said non-neutral circuits and providing a transfer of data therebetween, said data coupler including a filter having one of a data bandpass and a data high pass characteristic within a selected range corresponding to desired data to be coupled between said non-neutral circuits.

2. The data-ready distribution panel of claim 1, further including a circuit breaker having at least one input terminal connected to said mains connection and at least one output terminal connected to said power buss, said circuit breaker being interposed between said mains connection and said data coupler.

3. The data-ready distribution panel of claim 1, wherein said data coupler is a bi-directional coupler.

4. The data-ready distribution panel of claim 1, wherein said data coupler includes one of a bandpass and a high-pass filter.

5. The data-ready distribution panel of claim 1, wherein said data coupler includes an inductive coupler.

6. The data-ready distribution panel of claim 1, wherein said main comprises a multi-phase mains,
    said power bus comprises a number of electrical conductors corresponding to the number of mains phases, and wherein
    said data coupler provides coupling to said number of electrical conductors.

7. The data-ready distribution panel of claim 6, wherein said data coupler includes a plurality of filters numbering one less than the number of electrical conductors to which said data coupler is connected.

8. The power line signal coupler of claim 1, wherein
    said first circuit power mains comprises a first circuit busbar,
    said second circuit power mains comprises a second circuit busbar, and
    said first and said second leads comprise one of screw connectors and clip-on connectors which directly attach said data passing filter to said first circuit busbar and said second circuit busbar.

9. A power line signal coupler, comprising:
    a first connector lead connected to a first circuit power mains;
    a second connector lead having a signal coupling with said first connector lead and being connected to a second circuit power mains wherein said first connector lead and said second connector lead are twisted providing inductive coupling therebetween; and
    a data passing filter having an input terminal connected to said first connector lead and an output terminal connected to said second connector lead, wherein a signal path between said first and said second circuit power mains is provided by signal coupling between said first and said second connector leads and said high pass filter.

10. The power line signal coupler of claim 9, wherein said second connector lead signal coupling comprises inductive coupling.

11. The power line signal coupler of claim 9, further including
a third connector lead having a signal coupling with at least said first connector lead and being connected to a third circuit power mains; and
a further data passing filter having an input terminal connected to one of said first connector lead and said second connector lead and an output terminal connected to said third connector lead, wherein a direct signal path between one of said first and said third circuit power mains, and said second and said third circuit power mains is provided by direct signal coupling between a corresponding one of said first and said third connector leads with said further high pass filter, and said second and said third connector leads with said further high pass filter.

12. A signal coupler, comprising:
a plurality of inductively coupled leads; and
a filter providing a selected bandpass and having an input connected to a first of said inductively coupled leads and an output connected to a second of said inductively coupled leads wherein said plurality of inductively coupled leads includes a portion of inductively coupled leads twisted together.

13. The signal couple of claim 12, wherein signal coupling is provided among said plurality of inductively coupled leads with a plurality of filters having a number one less than the number of inductively coupled leads between which signal coupling is to be provided.

14. The signal coupler of claim 12, wherein said filter comprises one of a high pass and a bandpass filter.

* * * * *